United States Patent
Mayr

[19]

[11] Patent Number: 5,984,039
[45] Date of Patent: Nov. 16, 1999

[54] COUPLING ASSEMBLY

[75] Inventor: Nikolaus Mayr, Reischach/Bruneck, Italy

[73] Assignee: Lohr & Bromkamp GmbH, Offenbach/Main, Germany

[21] Appl. No.: 08/947,953

[22] Filed: Oct. 9, 1997

[30]     Foreign Application Priority Data

Oct. 11, 1996 [IT] Italy ................................. MI96A2113

[51] Int. Cl.$^6$ ........................... F16D 43/284; F16H 48/22
[52] U.S. Cl. ............................ 180/248; 192/35; 192/49; 192/103 F; 464/139
[58] Field of Search ........................... 192/35, 49, 103 F; 464/139, 140, 141; 180/248; 475/231

[56]              References Cited

U.S. PATENT DOCUMENTS

| | | | |
|---|---|---|---|
| 4,681,180 | 7/1987 | Oyama et al. ........................ | 192/49 X |
| 4,960,011 | 10/1990 | Asano ....................................... | 74/650 |
| 5,007,885 | 4/1991 | Yamamoto et al. .................... | 475/231 |
| 5,041,069 | 8/1991 | Horst ....................................... | 475/231 |
| 5,070,975 | 12/1991 | Tanaka et al. ........................... | 192/35 |
| 5,080,187 | 1/1992 | Asano et al. ............................ | 180/248 |
| 5,269,399 | 12/1993 | Ito et al. ................................. | 464/140 X |
| 5,295,921 | 3/1994 | Ippolito et al. ........................ | 192/49 X |
| 5,526,912 | 6/1996 | Gassmann ................................. | 192/57 |
| 5,690,201 | 11/1997 | Gassmann ................................. | 192/35 |
| 5,699,888 | 12/1997 | Showalter ................................. | 192/35 |
| 5,735,764 | 4/1998 | Shaffer et al. .................. | 192/103 F X |
| 5,827,145 | 10/1998 | Okcuoglu ........................ | 192/103 F X |

FOREIGN PATENT DOCUMENTS

| | | |
|---|---|---|
| 2218778 | 11/1989 | United Kingdom . |
| 2231628 | 11/1990 | United Kingdom . |
| 2281109 | 2/1995 | United Kingdom . |
| 2284869 | 6/1995 | United Kingdom . |

*Primary Examiner*—Rodney H. Bonck
*Attorney, Agent, or Firm*—Howard & Howard

[57]                ABSTRACT

A coupling assembly has at least one friction coupling unit which comprises a driveable housing and a hub to be driven, and having differential-speed-dependent actuating means operating by a pressure agent and comprising a pump unit. The pump unit comprises housing parts and hub parts, which housing parts are rotatable relative to said hub parts with the one part of the pump unit being connected in a rotationally fixed way to the housing of the friction coupling unit and the other parts of the pump unit being connected in a rotationally fixed way to the hub of the friction coupling unit. The hub of the at least one friction coupling unit is receiving an outer joint part of a constant velocity universal joint.

12 Claims, 10 Drawing Sheets

COUPLING ASSEMBLY

BACKGROUND OF THE INVENTION

The invention relates to a coupling assembly having at least one friction coupling unit which comprises a driveable housing and a hub to be driven, and having differential-speed-dependent actuating means operated by a pressure agent and comprising a pump unit. The pump unit comprises housing parts and hub parts, which housing parts are rotatable relative to the hub parts, with the one part of the pump unit being connected in a rotationally fixed way to the housing of the friction coupling unit and the other parts of the pump unit being connected in a rotationally fixed way to the hub of the friction coupling unit.

A vehicle axle module with two such coupling assemblies is known from U.S. Pat. No. 4,960,011 wherein the axle housing comprises two cast-on axle tube projections in which axle shafts are supported directly by means of a differential carrier so as to be coaxially aligned. The assembly is obviously provided for rigid rear axles wherein the axle housing, as a whole, is suspended resiliently relative to a vehicle.

More widespread use is found for axle designs wherein the axle housing is fixedly arranged at the vehicle and wherein the wheels are driven by means of driveshafts with inner joints arranged at the axle housing and with outer joints arranged at the wheels. In the case of vehicles with small dimensions there exists a problem in that the space available for the driveshafts is so small that it is necessary to use joints with large joint angles, such joints being expensive and of a particularly high quality. This problem is particularly prevalent in the case of steerable axles wherein the joints not only have to accommodate the spring travel, but also the steering angle. This may lead to restrictions regarding the spring travel and the steering angle if joints with sufficiently large joint angles are not available.

It is therefore the object of the present invention to provide a coupling assembly of the initially mentioned type for propeller shafts, vehicle axle modules or the like, which coupling assembly, while having a simpler design, permits a longer spring travel and greater steering angles.

SUMMARY OF THE INVENTION

The objective is achieved in that the hub of the at least one friction coupling unit receives an outer joint part of a constant velocity universal joint. The outer joint part may be produced integral with the hub of the at least one friction coupling unit or it may be separate and inserted into the hub, while engaging the latter via driving means. Furthermore, the hub of the at least one friction coupling unit may be designed so as to be separatable from the hub parts of the pump unit. In particular, in the case of a fixed constant velocity universal joint, the joint center, defined by the point of intersection of the axes of the joint parts, may be arranged in the interior of the friction coupling unit or, in the case of a plunging joint, the joint center is plungeable into the interior of the friction coupling unit. The design described here is particularly suitable for being used in a propeller shaft of a motor vehicle. By integrating the friction coupling unit and constant velocity universal joint, it is possible to use more simply designed joints with small joint angles because as a result of an increased distance between the joint centers, the articulation angles are reduced. For example, it is possible to use simple cage-less universal joints. The above-mentioned solution can be applied to motor vehicles with a second axle provided with a hang-on system which, in the case of a speed differential between the permanently driven axle and the axle which is normally dragged along, closes the friction coupling and thus drives the latter axle.

According to a further advantageous embodiment it is proposed that two friction coupling units with one constant velocity universal joint each are integrated in a vehicle axle module. As a result of the integrated design proposed here, with a predetermined track gauge and a predetermined spring travel and steering angle, the required maximum joint angles are reduced due to the increased distance between the joint centers of the respective inner and outer joints while the length of the sideshafts is increased. Due to the coupling design selected, the differential drive can be eliminated. This solution is also suitable for hang-on designs, i.e. for driving a second driving axle of a vehicle whose first driving axle is driven permanently, preferably by a differential drive. However, this application is also particularly suitable for single-seat cross-country vehicles which, due to a small track gauge, can do without a differential, even at the permanently driven driving axle.

As regards the vehicle axle module, preferred embodiments will be mentioned below. According to a first advantageous embodiment, the hubs of the friction coupling units are designed so as to be separatable from the hub parts of the pump units. By introducing this measure, it is possible to exchange damaged driving joints without having to remove the pump units.

According to a second advantageous embodiment it is proposed that the two housings are mounted on a shaft journal which, between the housings, carries a drive gear, and a sprocket or cogged belt gear. By using one single shaft journal, the number of parts is reduced.

According to a further advantageous embodiment, the two housings are designed to be connected so as to form one piece while carrying a drive gear, a sprocket or cogged belt gear. By integrating the housings into one another in such a way, the number of parts is reduced and the length of the assembly is reduced in the axial direction, thus permitting further reductions in the maximum joint angles required.

The pump units are provided in particular in the form of visco-lok pumps according to DE 43 43 307 A1, i.e. the pump units each comprise a shear pump which comprises a pump element with a shear channel that extends in the circumferential direction and, in a C-shaped way, covers a delimited circumferential angle of the pump element. The shear pump comprises a plate element which is rotatable relative to the pump element and which closingly rests on said shear channel, with the shear channel connecting a compensating chamber with a pressure chamber, which pressure chamber is delimited by a piston, which piston is provided for actuating the friction coupling. Pumps of this type comprise a high performance density in that within a small space they are able to build up high piston forces even at low relative speeds.

The joints used are preferably DO-joints, VL-joints or tripode joints with a long axial plunge.

The invention refers to motor vehicles with an engine and an adjoining gearbox unit, wherein a first driving axle with a differential drive is drivingly connected to a gearbox output element of the gearbox unit at a fixed rotational ratio and wherein a second driving axle is drivingly connected to the gearbox output element of the gearbox unit by means of a propeller shaft, with the propeller shaft comprising a coupling assembly in accordance with the invention.

The invention also refers to a motor vehicle with an engine and an adjoining gearbox unit, wherein a first driving axle is drivingly connected to a gearbox output element of the gearbox unit at a fixed rotational ratio and wherein a second driving axle is provided in the form of a steerable axle and equipped with an axle drive module in accordance with the invention. In particular, it is proposed that an undivided propeller shaft is drivingly connected to the axle drive units of both driving axles at a fixed rotational ratio.

Furthermore, the invention refers to motor vehicles with an engine and an adjoining gearbox unit, wherein a first driving axle is provided in the form of a steerable axle and connected by means of a differential to a gearbox output element of a gearbox unit, and wherein a second driving axle is equipped with an axle drive module in accordance with the invention, with the input element of the differential drive and the axle drive of the second driving axle preferably being connected to one another at a fixed rotational ratio.

Preferred embodiments of the invention will be explained below with reference to the drawings wherein.

DETAILED DESCRIPTION OF THE PREFERRED EMBODIMENT

Figure 1:
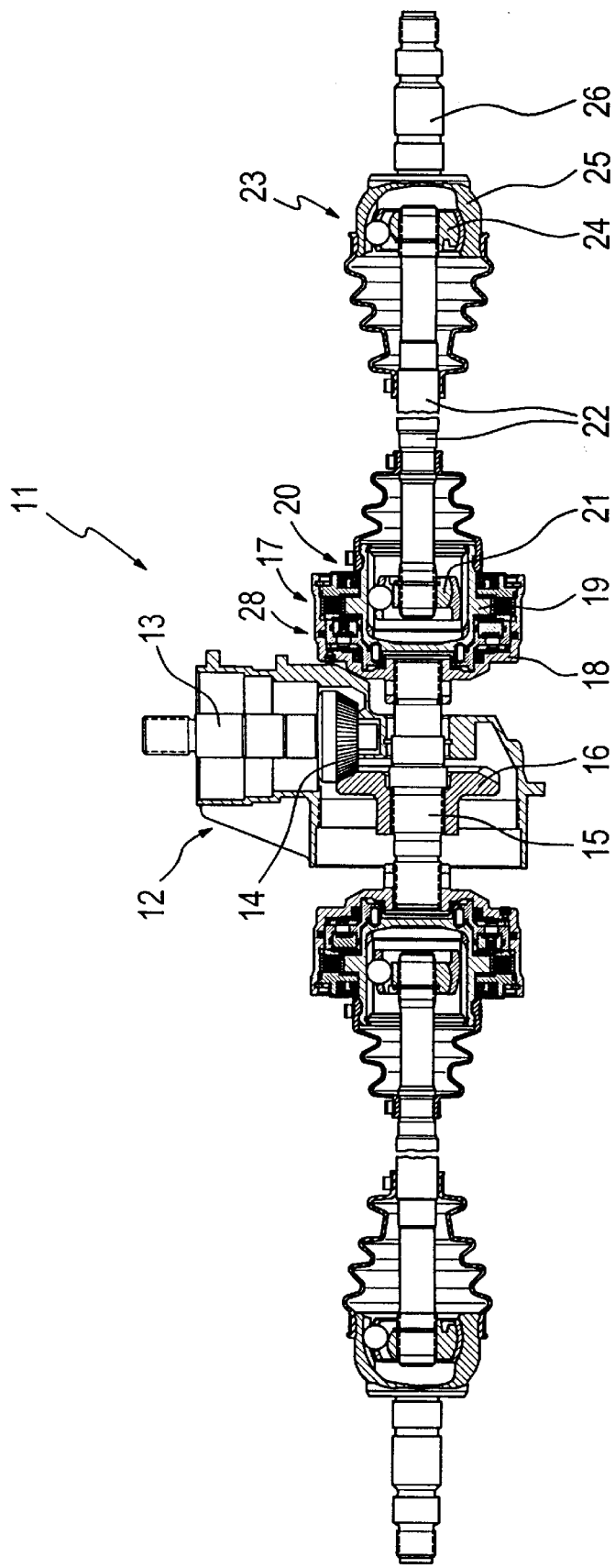
FIG. 1 shows an axle module with an inventive coupling assembly provided with an angle drive, inner plunging joints and outer fixed joints.

FIG. 1 shows a motor vehicle axle which is provided with a driving axle module 11 and, approximately in its center, with an angle drive 12 which comprises an input shaft journal 13 with a bevel gear 14 and an output shaft journal 15 with a ring gear 16. Two symmetrically arranged friction coupling units 17 with integrated pump units 28 and integrated constant velocity universal joints 20 are positioned coaxially relative to the shaft journal 15. The housings 18 of the friction coupling units 17 are arranged on the shaft journal 15 so as to be rotationally fixed. The hubs 19 of the friction coupling units 17 at the same time form the outer joint parts of the constant velocity universal joints 20 whose inner joint parts 21 are connected to sideshafts 22. The sideshafts 22, in turn, are connected to outer constant velocity universal joints 23, with the sideshafts 22 being inserted into the inner joint parts 24 of the constant velocity joints 23 and with the outer joint parts 25 of the constant velocity universal joints 23 carrying integrally formed-on shaft journals 26.

Figure 2:
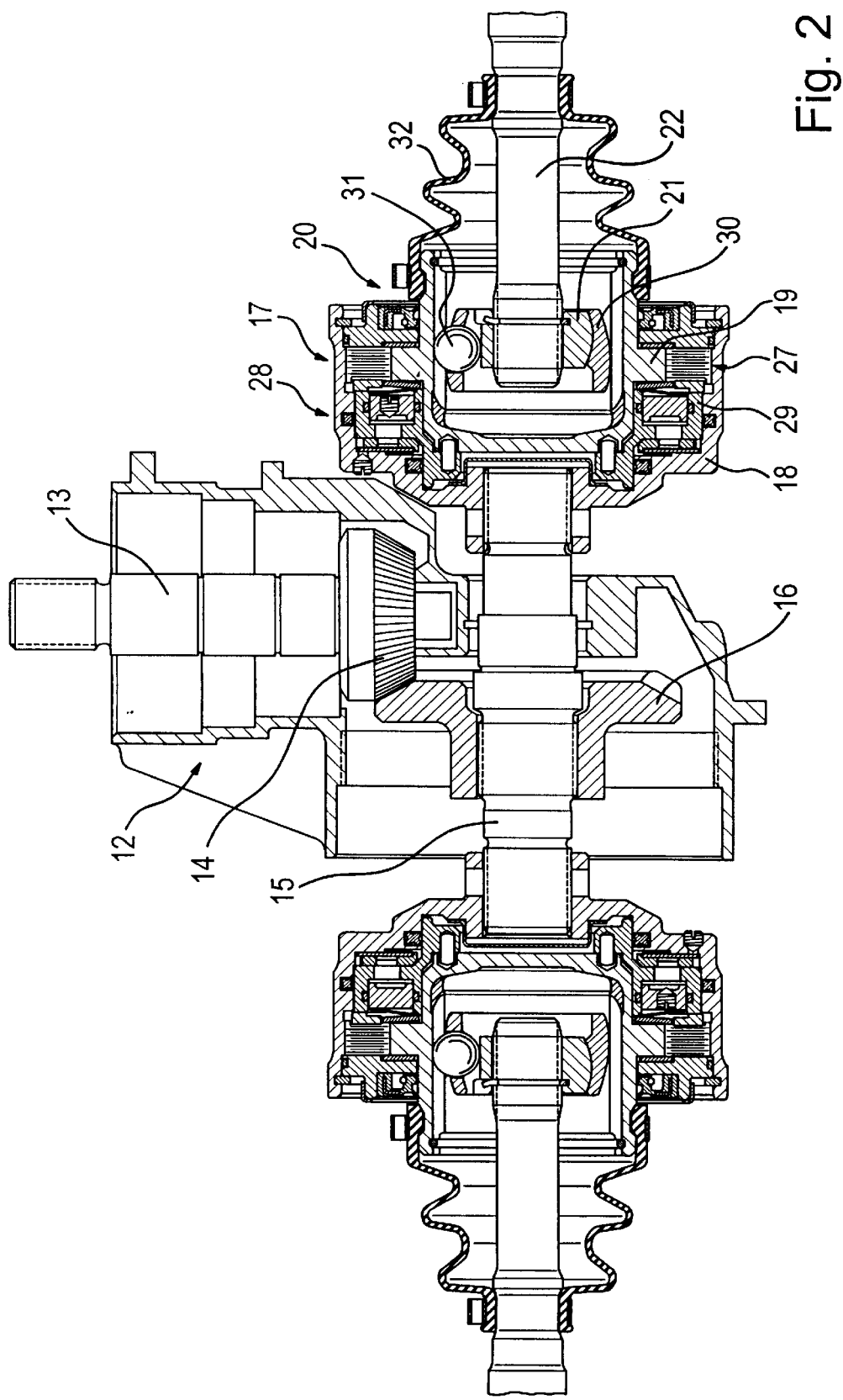
FIG. 2 is an enlarged illustration of the axle module provided with the angle drive and plunging joints according to FIG. 1.

In FIG. 2, the above-mentioned details have been given the same reference numbers, and reference is made to the above description. As far as further details are concerned, the friction coupling units 17 are provided with a plate package 27 whose plates are alternately connected to the housing 18 and to the hub 19. There is also shown a pump unit 28 and a piston 29 which is loaded by the pump unit 28 and which, in turn, loads the plate package 27.

At each of the integrated constant velocity joints 20, in addition to the outer joint part (19) formed by the hub 19 of the coupling unit 17 and the above-mentioned inner joint part 21, there is shown a cage 30 and one of the torque transmitting balls 31. These parts are each guided in the outer joint part (19) so as to be longitudinally movable. The outer joint part (19) is sealed relative to the sideshaft 22 by means of a convoluted boot 32.

Figure 3:
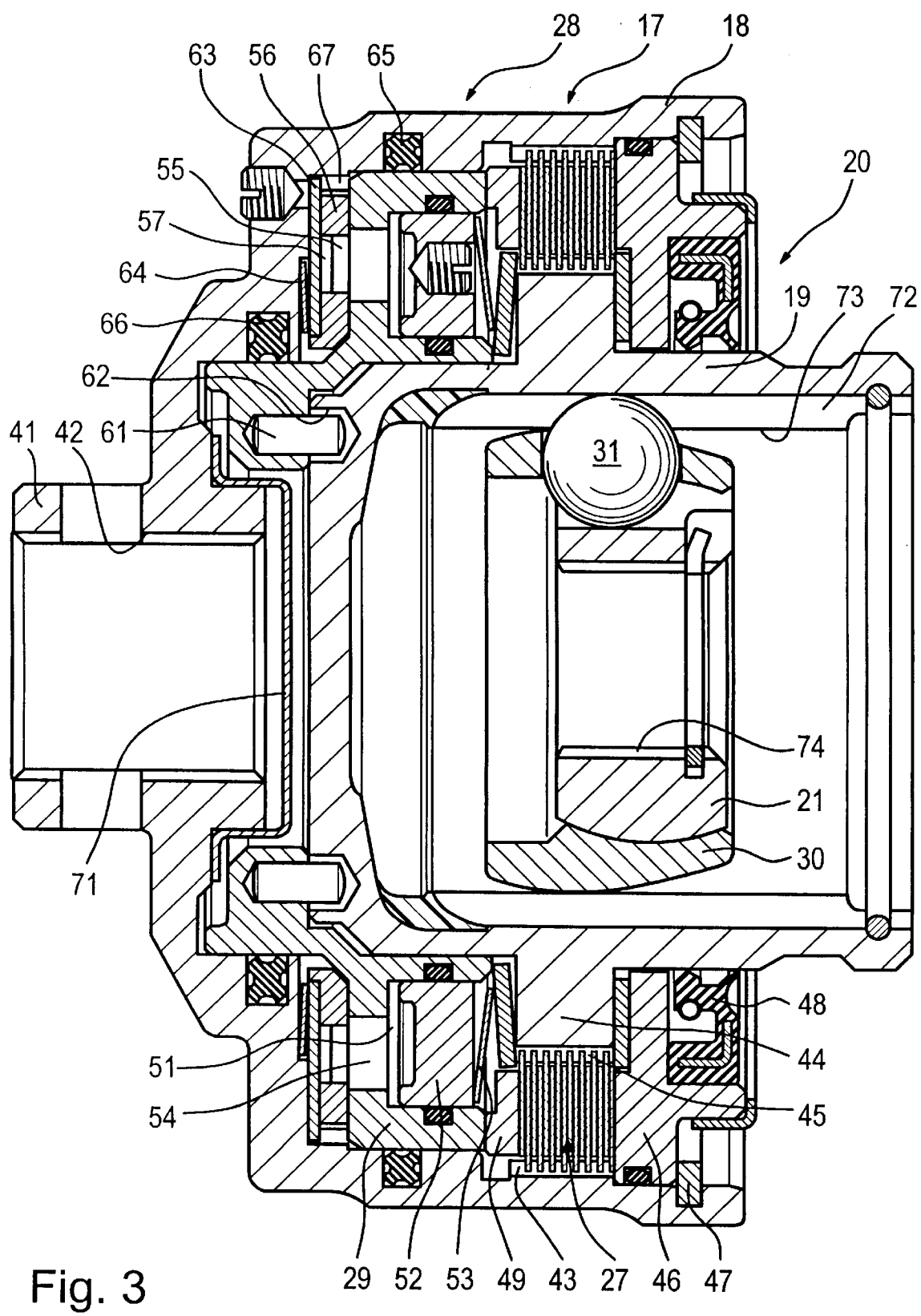
FIG. 3 in the form of a detail, shows a friction coupling unit with a plunging joint according to FIGS. 1 and 2.

FIG. 3 shows the friction coupling unit 17 with an integrated constant velocity joint 20 according to FIG. 2 in the form of a detail in an enlarged scale, with the pump unit 28 and the piston 29 also being identifiable in detail. Otherwise, the illustration shows the following: the housing 18 comprises a hub projection 41 which, by means of the shaft teeth 42, is attached to a shaft journal in a rotationally fixed way and axially secured relative thereto. The outer plates of the plate package 27 are positioned on inner teeth 43 in the housing 18. The hub 19 carries a cylindrical collar 44 with outer teeth 45 accommodating the inner plates of the plate package 27 in a rotationally fixed way. Towards one side, the plate package 27 is supported by a cover 46 which is axially secured by a securing ring 47 in the housing 18. A seal 48 is inserted into the cover 46 and sealingly rests against the hub 19. The plate package 27, by means of a disc 49 displaced directly by the piston 29, is axially loaded relative to the cover 46. In the piston 29 there is provided a compensating chamber 51 which is sealed by an annular piston 52 resiliently supported on a plate spring 53. The parts mentioned here form a reservoir for the medium of the pump assembly 28. By means of bores 54 in the piston 29, the compensating chamber 51 is connected to control apertures 55 in a pump element 56 which comprises a shear groove 57 which is approximately C-shaped in an axial view. The pump element 56 is connected to the piston 29 so as to be rotationally fixed or rotatable to a limited extent, with the piston 29, in turn, being connected to the hub 19 so as to be rotationally fixed or rotatable to a limited extent. For this purpose there are provided pins 61 in the piston, which pins 61 engage over-dimensioned bores 62 in the hub 19. Furthermore, the pump assembly 28 comprises a plate element 63 which, in a rotationally fixed way, is connected to the housing 18. The plate spring 64 presses the plate element 63 against the pump element 56 so that the shear groove remains sealed, with pressure being built up at one end of the shear channel in the case of a relative rotation. The housing 18 is sealed relative to the piston 29 by two seals 65, 66 which, overall, seal a pressure chamber 67 which is connected to one end of the shear groove 57. The system consisting of the pressure chamber 67 and the compensating chamber 51, on its entirety, is filled with a highly viscous fluid. A cover 71 is positioned inside the hub projection 41. The coupling assembly with an integrated pump assembly was first described in DE 43 43 307 and is now know as Visco-Lok pump to those versed in the art. The hub 19 forms the outer joint part of the constant velocity universal joint 20 which, as can be seen, is provided with an inner joint part 21 with a spherical surface, a cage 30 guided thereon and torque transmitting balls 31. The ball 31 is guided in a corresponding track 72 in the outer joint part (19). The cylindrical inner face 73 of the outer joint part (19) guides the cage 30 which is longitudinally movable and articulatable relative to said outer joint part. A sideshaft is insertable into inner teeth 74 in the inner joint part 21. The joint constitutes a prior art DO-joint with axis-parallel tracks and two axially offset spherical guiding faces at the cage.

Figure 4:
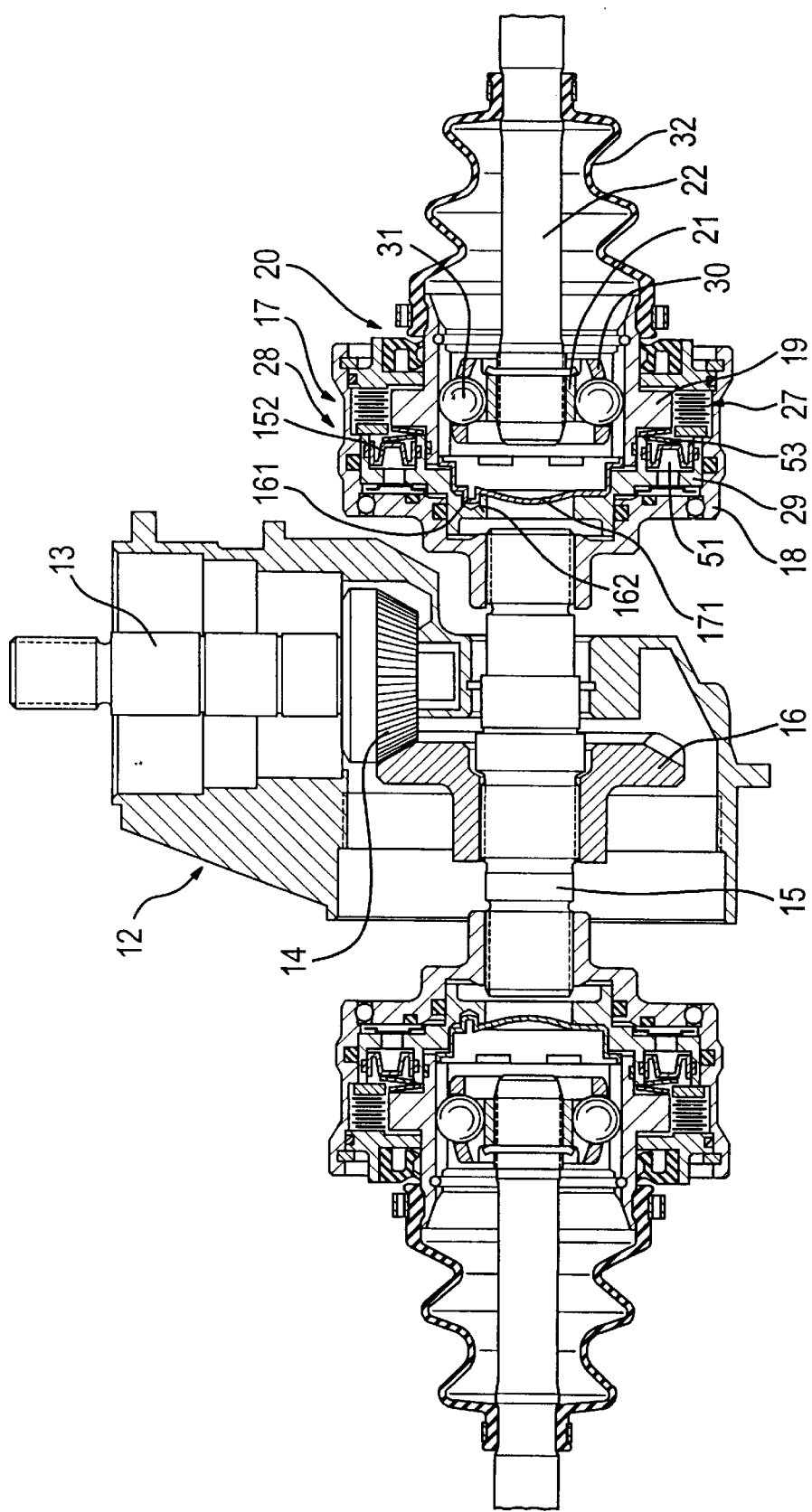
FIG. 4 shows an angle drive and a friction coupling unit with a plunging joint similar to FIG. 3, in a modified embodiment.

FIG. 4 shows an axle drive module which largely corresponds to that shown in FIG. 2. Identical details have been given identical reference numbers. To that extent, reference is made to the respective description. Instead of the solid annular piston 52 shown in FIG. 3, there is provided a plate metal element 152 which is resiliently supported on a plate spring 53 and delimits the compensating chamber 51. Instead of the plate metal cover 71 shown in FIG. 3, FIG. 4 shows a plate metal cover 171 which is inserted into the piston 29 of the pump unit and which is rotationally secured by means of a formation 161 engaging a bore 162. Otherwise, the axle drive module according to FIG. 4 largely corresponds to that shown in FIG. 2, with the friction coupling units and the constant velocity universal joints largely corresponding to those illustrated in FIG. 3.

Figure 5:
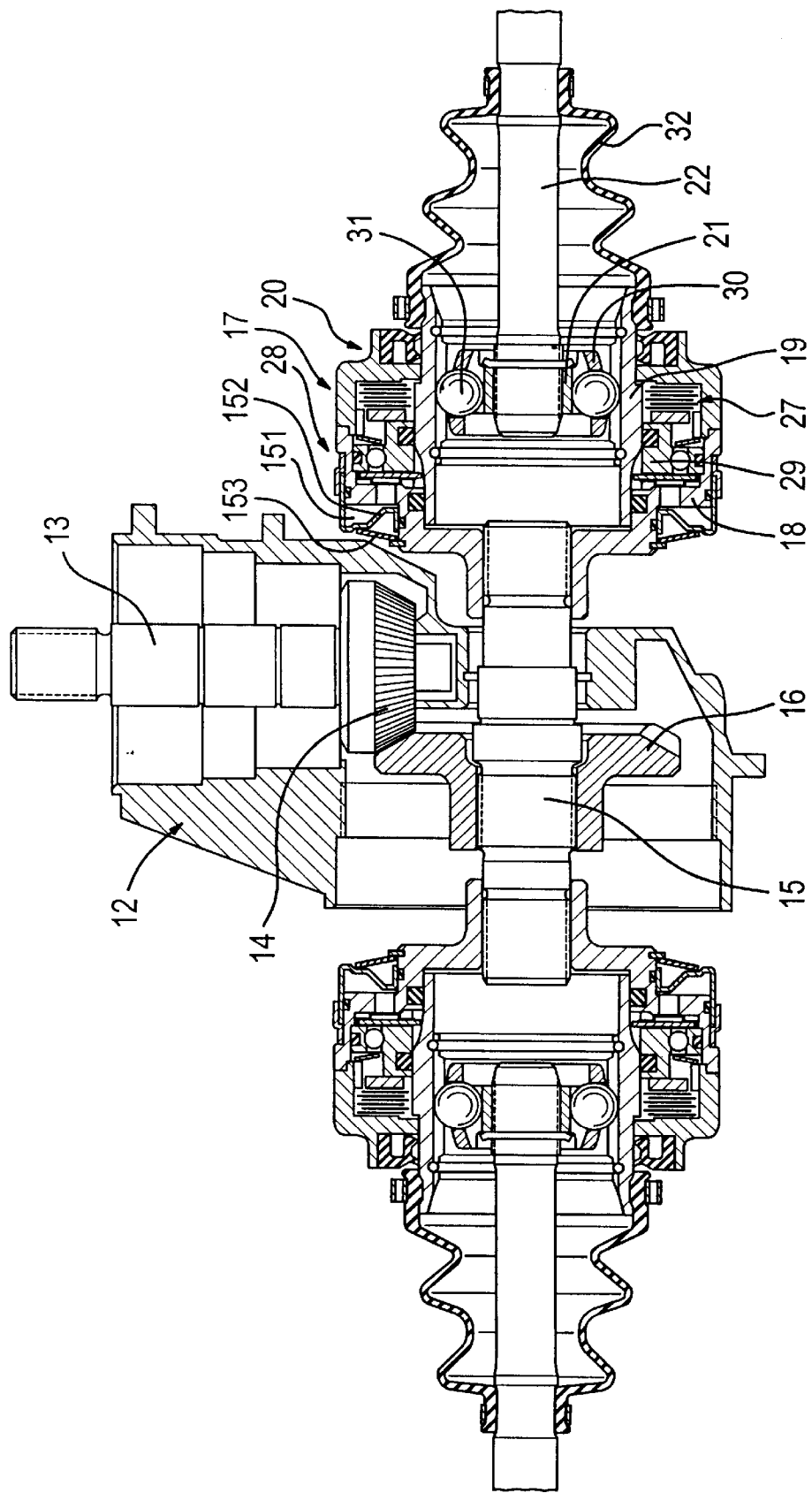
FIG. 5 shows an angle drive and a friction coupling unit with a plunging joint similar to FIG. 3, in a modified embodiment.

The axle drive module shown in FIG. 5 is similar to that illustrated in FIGS. 2 and 4. Identical details have been given identical reference numbers. To that extent, reference is made to the description of FIG. 2. FIG. 5 deviates from the coupling/joint unit according to FIG. 3 in that a compensating chamber 151 is formed by a displaceable plate element 152 on the outside of the housing 18. The plate spring 153, in which the plate metal element 151 is supported, is also located on the outside of the housing which consists of several parts. Otherwise, the coupling assembly/constant velocity joint unit largely corresponds to that shown in FIG. 3.

Figure 6:
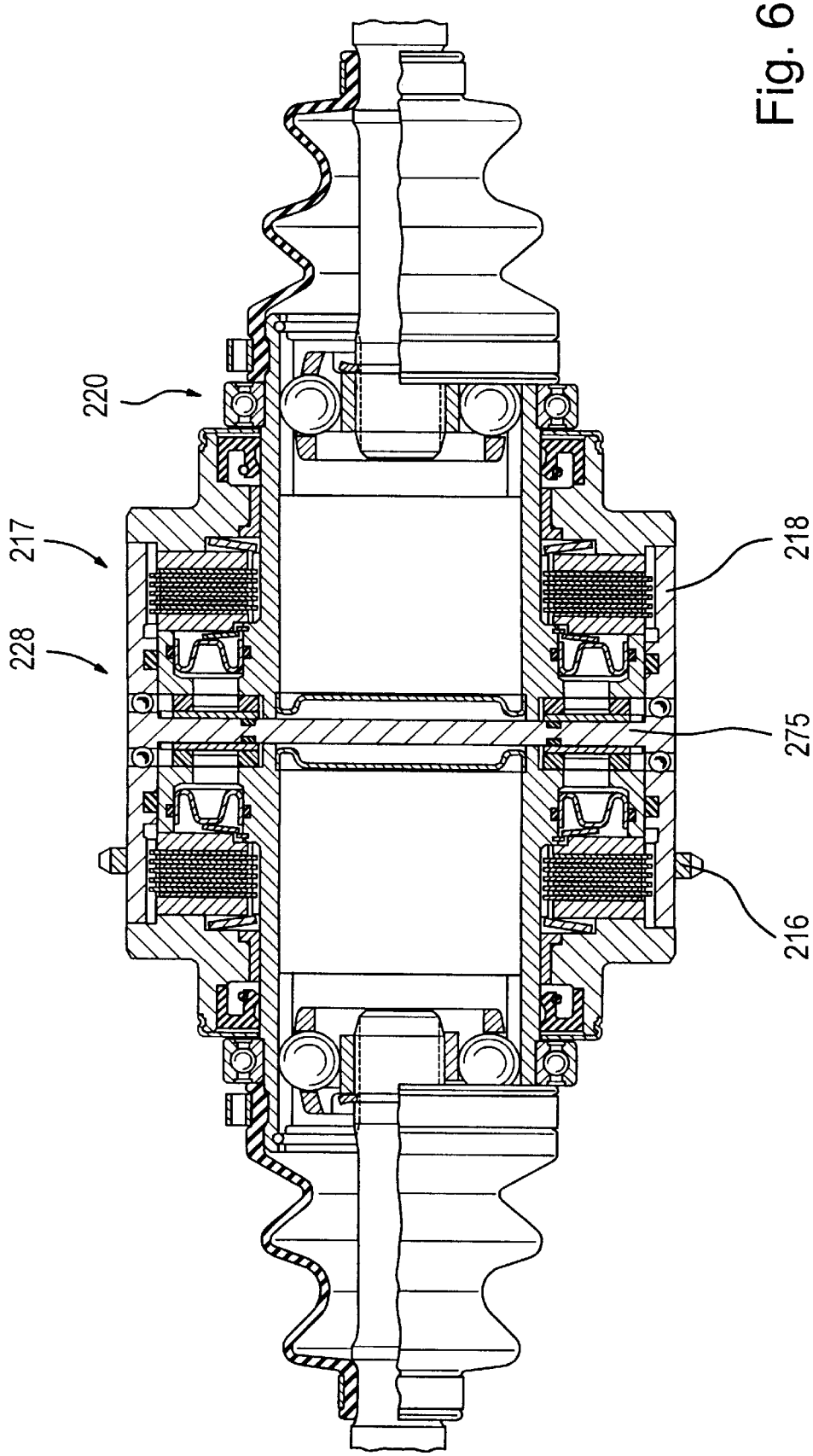
FIG. 6 shows an axle module with two inventive friction coupling units with integrated plunging joints with a common housing.

In FIG. 6, two units consisting of friction coupling units 217 with integrated pump units 228 and constant velocity universal joints 220 are integrated in a common housing 218. On the outside of the housing, there is provided a sprocket 216 by means of which the housing is directly driveable by a chain. The reference numbers of any details corresponding to those shown in FIGS. 2 and 3 have been increased by 200. To that extent, reference is made to the respective description. The housing 218 consists of three parts and comprises a central wall 275 which completely separates the friction coupling units 217 and the pump units 218 from one another.

Figure 7:
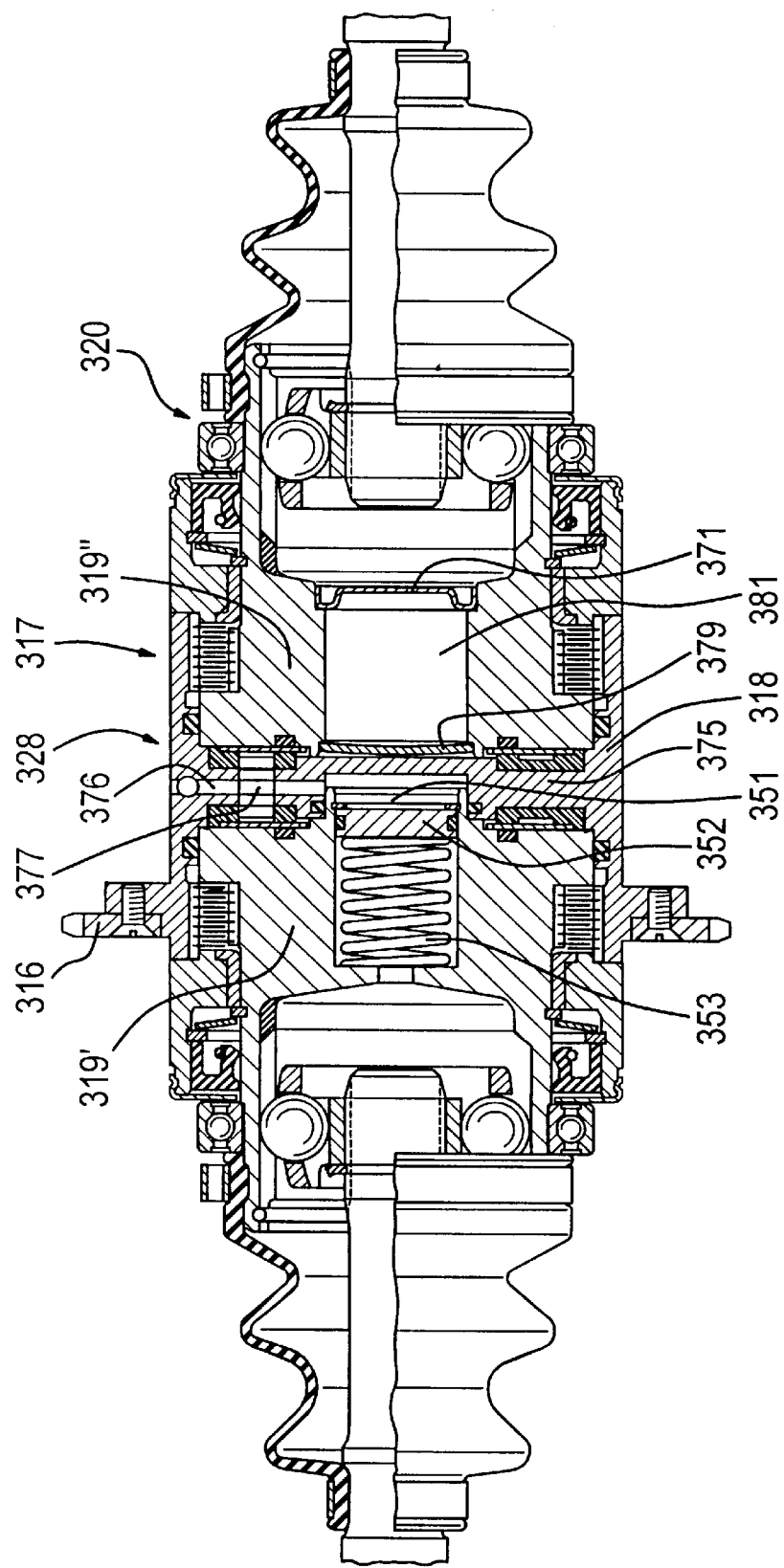
FIG. 7 shows an axle module similar to FIG. 6, in a modified embodiment.

FIG. 7 shows two units consisting of friction coupling units 317 with integrated pump units 328 and constant velocity universal joints 320 in a common housing 318. On the outside of the housing there is screwed on a sprocket 316 for direct driving purposes. Details of the friction coupling units and pump units have been given reference numbers which are increased by 300 as compared to those used in FIGS. 2 and 3. The housing 318 consists of three parts and comprises a central wall 375 which comprises a radial bore 376 and an axial bore 377 which connect the pump units 328 to a central compensating chamber 351 inside one of the hubs 319', which compensating chamber contains a piston 352 which is resiliently supported on a helical spring 353. In the second one of the hubs 319", a correspondingly cavity 381 is sealed towards the outside by a cover 379 and a plate metal cover 371.

Figure 8:
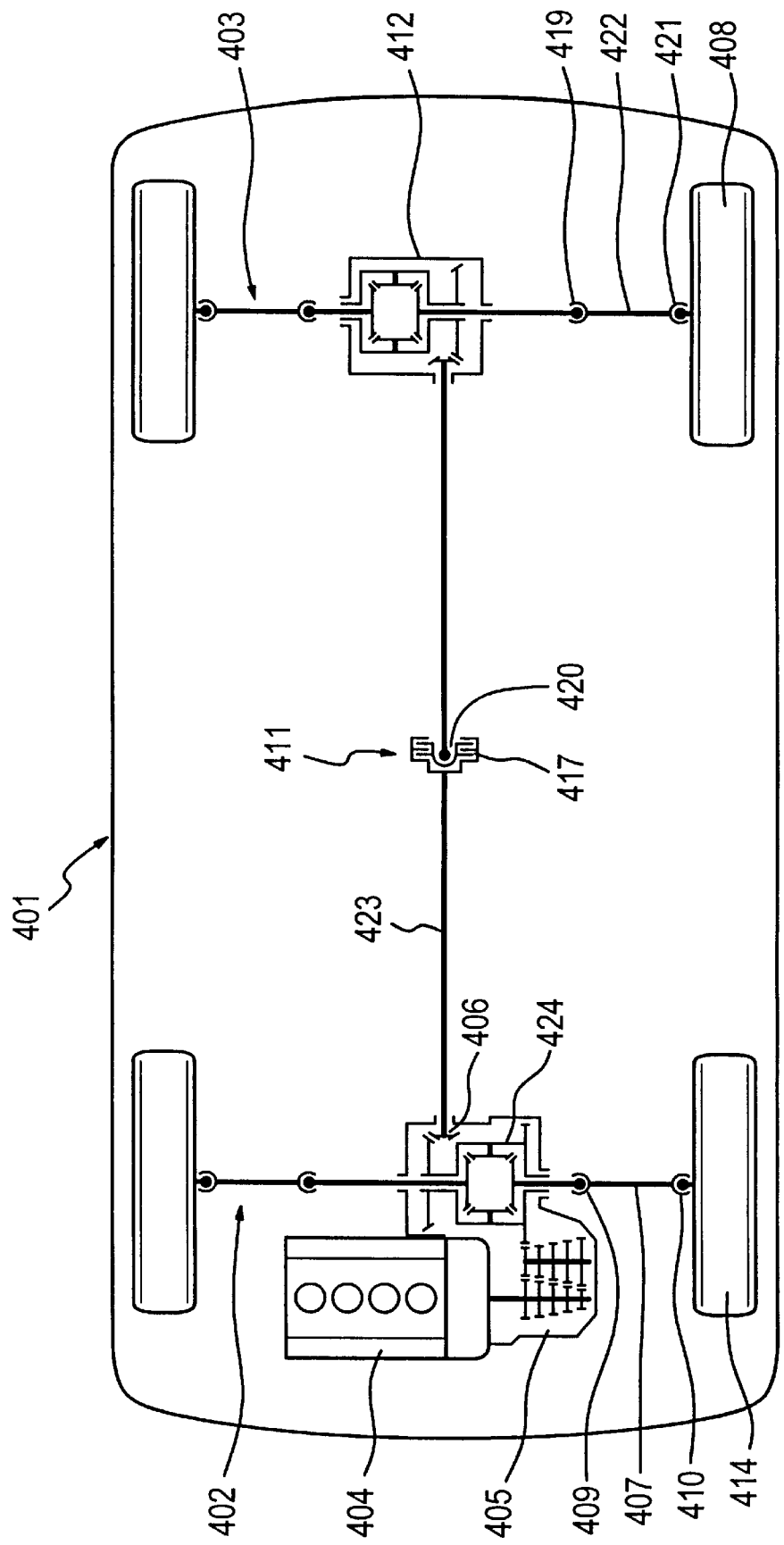
FIG. 8 is a symbolic illustration of a motor vehicle having an inventive coupling assembly in its propeller shaft.

FIG. 8 shows a motor vehicle 401 with a front axle 402 and a rear axle 403. An internal combustion engine 404 is positioned in front of the front axle and, by means of a gearbox 405 and a differential drive 424, drives the sideshafts 407 leading to the front wheels 414. The sideshafts are provided with inner and outer constant velocity universal joints 409, 410. An angle drive 406 drives a propeller shaft 423 which, by means of a second differential drive 412, drives the sideshafts 422 of the rear axle, which sideshafts are provided with inner and outer constant velocity universal joints 419, 421. Inside the propeller shaft 423 there is provided a unit 411 consisting of a friction coupling 417 with an integrated constant velocity universal joint 420 in accordance with the invention.

Figure 9:
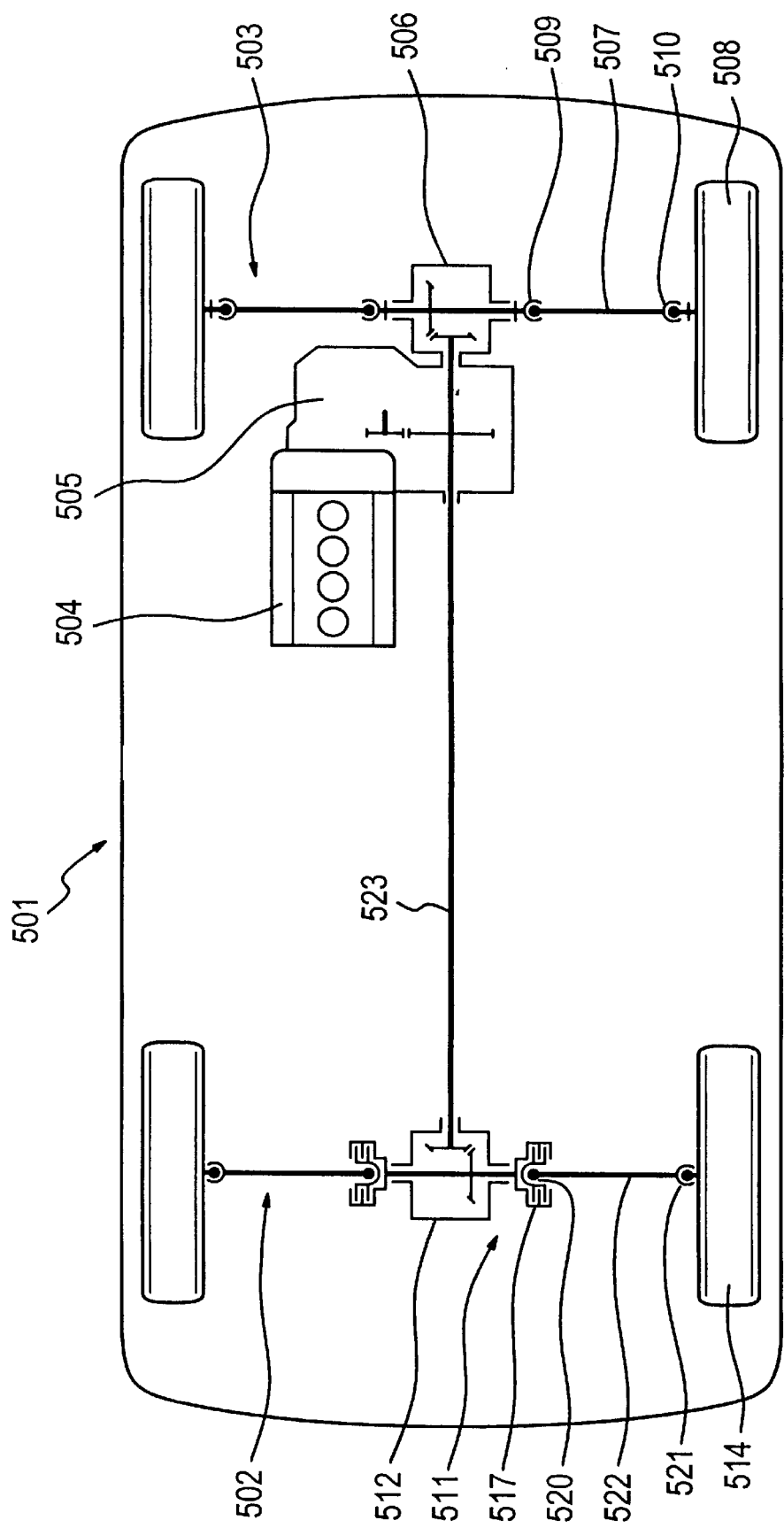
FIG. 9 is a symbolic illustration of a motor vehicle having an axle module with an inventive coupling assembly in the steering axle.

FIG. 9 shows a motor vehicle 501 with a front axle 502 and a rear axle 503. An internal combustion engine 504 is positioned close to the rear axle and, by means of a gearbox 505 and an angle drive 506, drives the sideshafts 507 leading to the rear wheels 508. The sideshafts are provided with inner and outer constant velocity universal joints 509, 510. A gearbox output element shaft 523 driving the angle drive 506 in the rear axle also drives an angle drive 512 in the front axle which comprises two sideshafts 522 leading to the front wheels 514 which are driven by inventive units 511 with an integrated friction coupling 517 and a constant velocity universal joint 520 and which, at their outer ends, are provided with further constant velocity universal joints 521. As it can be seen that the permanently driven rear axle does not contain a differential, the vehicle illustrated is a narrow-gauge vehicle, especially a single-seat vehicle. As the vehicle comprises a narrow track gauge, the integration of friction couplings 517 and constant velocity universal joints 520 is highly significant because at the front axle there is required a long spring travel combined with large steering angles.

Figure 10:
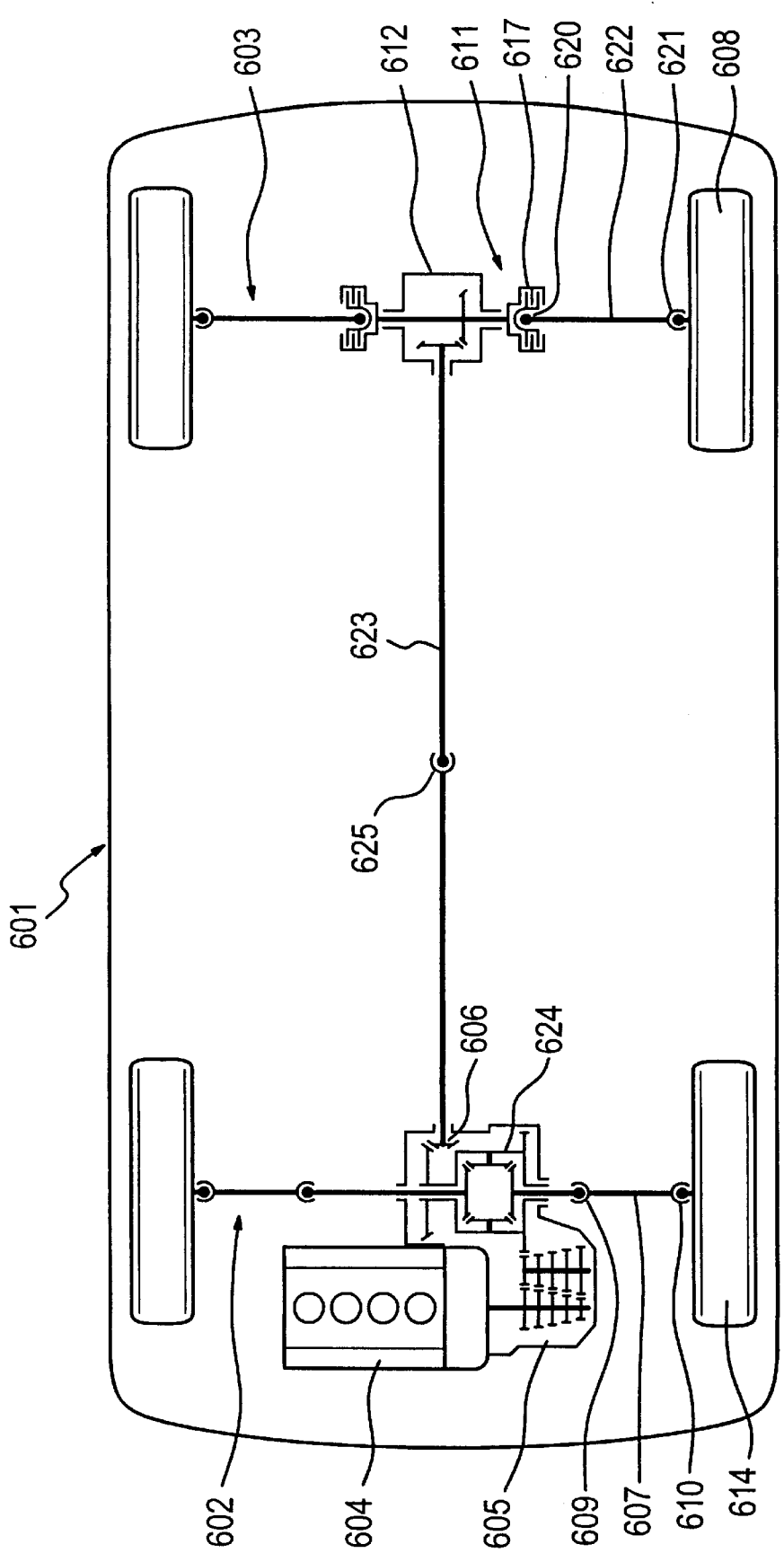
FIG. 10 is a symbolic illustration of a motor vehicle having an axle module with an inventive coupling assembly in its rear axle.

FIG. 10 shows a motor vehicle 601 with a front axle 602 and a rear axle 603. An internal combustion engine is positioned in front of the front axle and, via a gearbox 605 and a differential drive 624, drives the sideshafts 607 leading to the front wheels 614. The sideshafts 607 are provided with inner and outer constant velocity universal joints 609, 610. A gearbox output shaft 623 provided with a central joint 625 and driven by an angle drive 606 in the front axle, in turn, drives an angle drive 612 in the rear axle which comprises two sideshafts 622 leading to the rear wheels 608 which are driven by inventive units 611 with an integrated friction coupling 617 and constant velocity universal joints 620 and which, at their outer ends, are provided with further constant velocity universal joints 620. As it can be seen that the rear axle does not comprise a differential, the vehicle illustrated here is a vehicle with a front wheel drive and a hang-on assembly for the rear wheel drive in a particularly simple design. Integrating the friction coupling 617 and the constant velocity universal joints 620 is particularly advantageous for small off-highway vehicles with a long spring travel.

Several preferred embodiments have been disclosed. However, a worker of ordinary skill in the art would recognize that modifications would be within the scope of these embodiments. Thus, the following claims should be studied to determine the true scope and content of the present invention.

I claim:
1. A coupling assembly comprising
   at least one frictional coupling unit (17) which comprises a drivable housing (18) and a hub (19) to be driven and having differential-speed-dependent actuating means operated by a pressure agent and a pump unit (28), said pump unit having housing parts and hub parts, said housing parts being rotatable relative to said hub parts, with one of said parts of said pump unit (28) being connected in a rotationally fixed way to said housing (18) of said friction coupling unit (17) and said other of said parts of said pump unit being connected in a rotationally fixed way to said hub (19) of said friction coupling unit;

a constant velocity universal joint (20) having an outer joint part with an axis and an inner joint part (21) with an axis;

said hub (19) of said at least one friction coupling unit (17) receiving said outer joint part of said constant velocity universal joint (20), said outer joint part formed from one piece integrally with said hub (19) of said at least one friction coupling unit (17); and said hub (19) of said at least one friction coupling unit (17) being separatable from said hub parts of said pump unit (28).

2. A coupling assembly according to claim 1, wherein the center of said joint of said constant velocity universal joint (20), as defined by the point of intersection of the axes of said outer joint part and said inner joint part, is either arranged in a fixed location in said interior of said friction coupling unit (17) or is plungable into the interior of said friction coupling unit (17).

3. A coupling assembly according to claim 1, wherein two friction coupling units (17), each receiving one constant velocity universal joint (20) are integrated in a vehicle axle module.

4. A coupling assembly according to claim 3, wherein said housings (18) of said two friction coupling units (17) are mounted on a shaft journal (15) which, between said housings (18), carries one of a drive gear (16), a sprocket or a cogged belt gear.

5. A coupling assembly according to claim 3, wherein said housings (18) of said two friction coupling units (17) are connected to form one piece and carry one of a drive gear (316, 416), a sprocket or cogged belt gear.

6. A coupling assembly according to claim 1, wherein said pump unit (28) has a shear pump with a pump element (56) with a shear channel (55) said shear channel extending in a circumferential direction and having a C shape, which covers a delimited circumferential angle of the pump element, with said shear pump having a plate element (63) which is rotatable relative to said pump element (56) and which closingly rests on said shear channel, with said shear channel (55) connecting a compensating chamber (51) with a pressure chamber (67), said pressure chamber being delimited by a piston (29), said piston being provided for actuating the at least one friction coupling unit (17).

7. A coupling assembly according to claim 1, wherein said constant velocity universal joint (20) is a plunging constant velocity universal joint.

8. A motor vehicle (401) comprising:

an engine (404);

an adjoining gearbox unit (405);

a first driving axle (403) with a differential drive (424) drivingly connected to a gearbox output element of said gearbox unit (405) at a fixed rotational ratio;

a second driving axle (402) drivingly connected to said gearbox output element by means of a propeller shaft (423);

said propeller shaft having a coupling assembly with at least one frictional coupling unit (17) which comprises a drivable housing (18) and a hub (19) to be driven, and having differential-speed-dependent actuating means operated by a pressure agent and a pump unit (28), said pump unit having housing parts and hub parts, said housing parts being rotatable relative to said hub parts, with one of said parts of said pump unit (28) being connected in a rotationally fixed way to said housing (18) of the friction coupling unit (17) and said other of said parts of said pump unit being connected in a rotationally fixed way to said hub (19) of the friction coupling unit;

said hub (19) of said at least one friction coupling unit (17) receiving an outer joint part of a constant velocity universal joint (20);

said outer joint part formed from one piece integrally with said hub (19) of said at least one friction coupling unit (17); and said hub (19) of said at least one friction coupling unit (17) being separatable from said hub parts of said pump unit (28).

9. A motor vehicle (501) comprising:

an engine (504);

an adjoining gearbox unit (405);

a first driving axle (503) drivingly connected to a gearbox output element of said gearbox unit (505) at a fixed rotational ratio;

a second driving axle (502) provided in the form of a steerable axle; and said second driving axle (502) having an axle drive module with two friction coupling units (17) which each comprises a driveable housing (18) and a hub (19) to be driven, and having differential-speed-dependent actuating means operated by a pressure agent and a pump unit (28), said pump unit having housing parts and hub parts, said housing parts being rotatable relative to said hub parts, with one of said parts of said pump unit (28) being connected in a rotationally fixed way to said housing (18) of the friction coupling unit (17) and said other of said parts of said pump unit being connecting in a rotationally fixed way to said hub (19) of the friction coupling unit;

each of said hubs (19) of said two friction coupling units (17) receiving an outer joint part of a constant velocity universal joint (20); and said housings (18) of said two friction coupling units (17) are mounted on a shaft journal (15) which, between said housings (18), carries one of a drive gear (16), a sprocket or a cogged belt gear.

10. A motor vehicle according to claim 9, wherein each driving axle (502, 503) has an axle drive element (506, 512) and a propeller shaft (523) is drivingly connected to said axle drive elements (506, 512) of both of said driving axles (503, 512) at a fixed rotational ratio.

11. A motor vehicle (601) comprising:

an engine (604);

an adjoining gearbox unit (605);

a first driving axle (602) provided in the form of a steerable axle connected to a gearbox output element of said gearbox unit (605) by means of a differential (624);

a second driving axle (603) having an axle drive module with two friction coupling units (17) which each comprises a driveable housing (18) and a hub (19) to be driven, and having differential-speed-dependent actuating means operated by a pressure agent and a pump unit (28), said pump unit having housing parts and hub parts, said housing parts being rotatable relative to said hub parts, with one of said parts of said pump unit (28) being connected in a rotationally fixed way to said housing (18) of the friction coupling unit (17) and said other of said parts of said pump unit being connecting in a rotationally fixed way to said hub (19) of the friction coupling unit;

each of said hubs (19) of said two friction coupling units (17) receiving an outer joint part of a constant velocity universal joint (20); and said housings (18) of said two friction coupling units (17) are mounted on a shaft journal (15) which, between said housings (18), carries one of a drive gear (16), a sprocket or a cogged belt gear.

12. A motor vehicle according to claim 11, wherein an input element of said differential (624) and an axle drive element (612) of said second driving axle (603) are connected to one another at a fixed rotational ratio.

* * * * *

UNITED STATES PATENT AND TRADEMARK OFFICE
CERTIFICATE OF CORRECTION

PATENT NO. : 5,984,039
DATED : November 16, 1999
INVENTOR(S) : Nikolaus Mayr

It is certified that error appears in the above-indentified patent and that said Letters Patent is hereby corrected as shown below:

Title page, item [73], Assignee: should read as follows:--
GKN Viscodrive GmbH, Lohmar, Germany--

Signed and Sealed this

Thirteenth Day of March, 2001

Attest:

NICHOLAS P. GODICI

Attesting Officer    Acting Director of the United States Patent and Trademark Office